Patented June 8, 1937

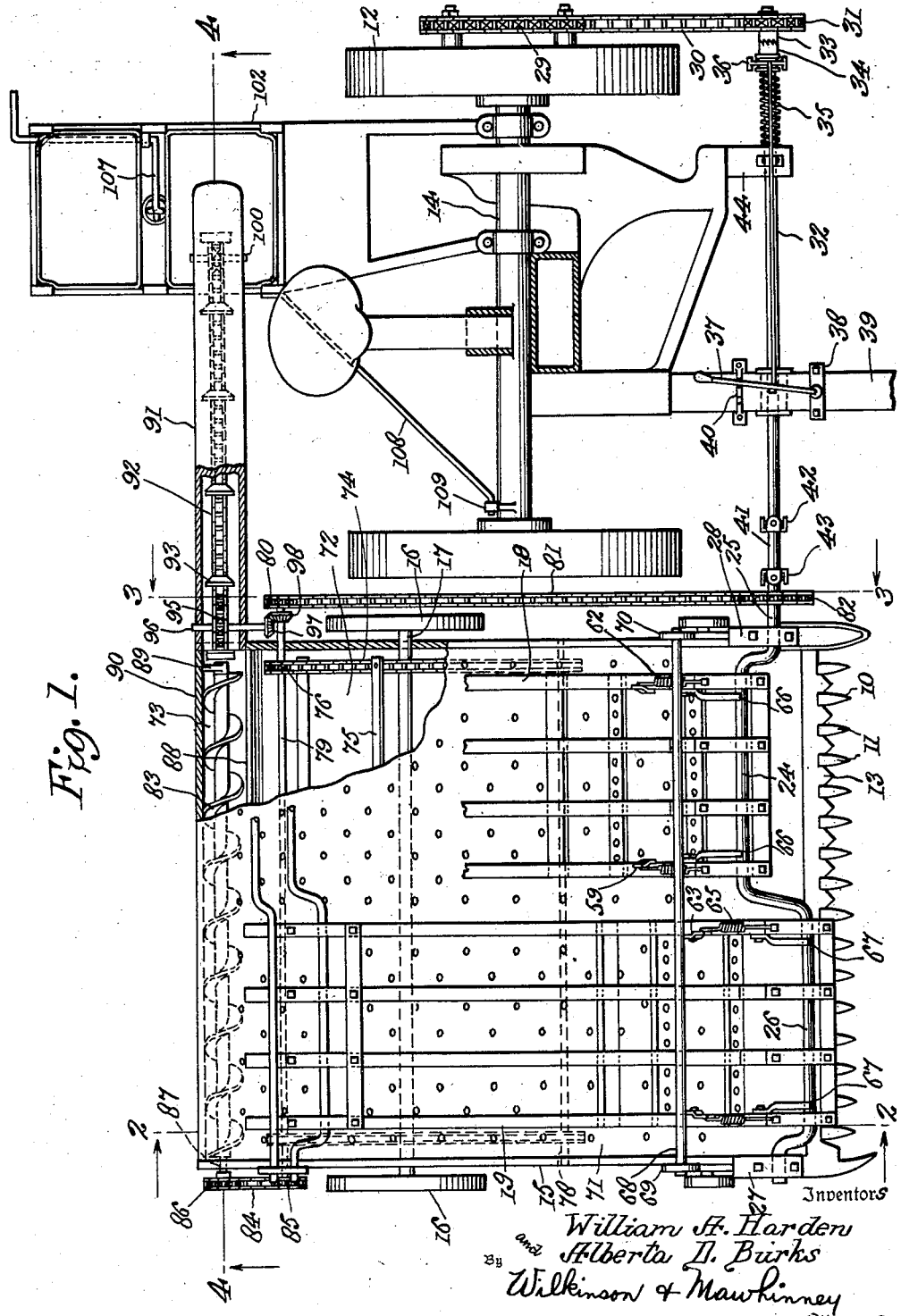

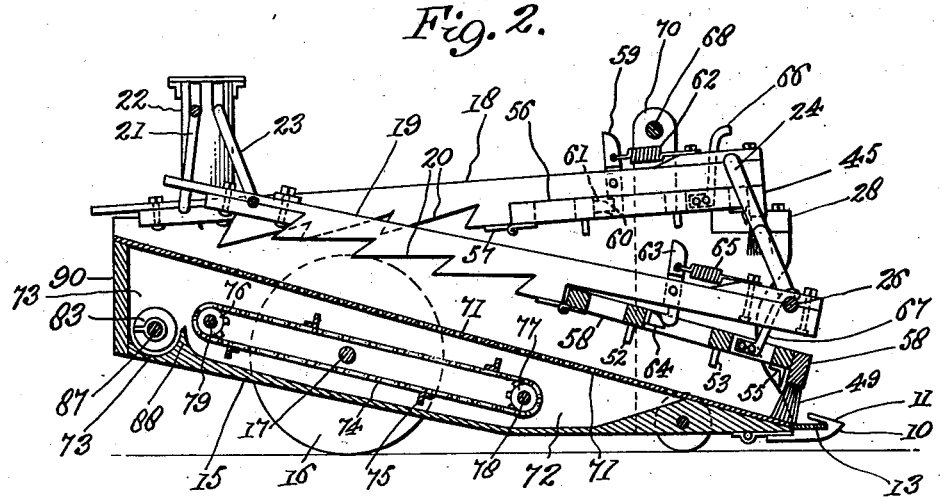
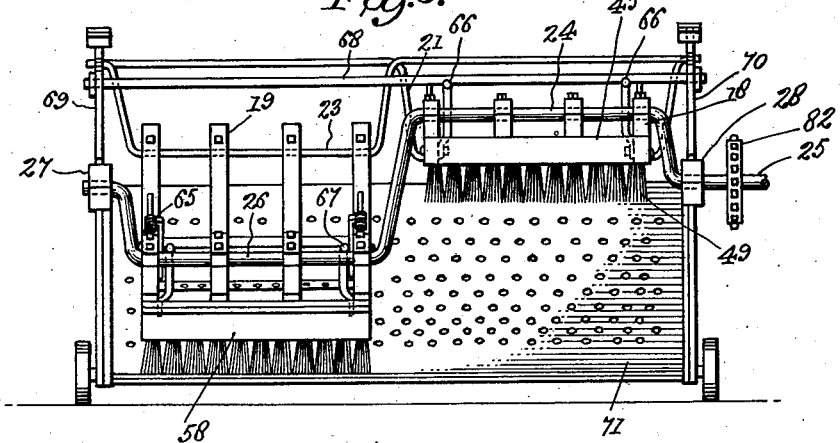
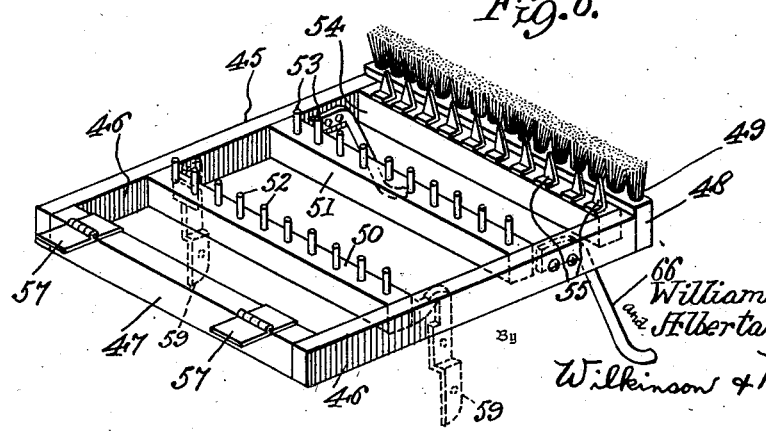

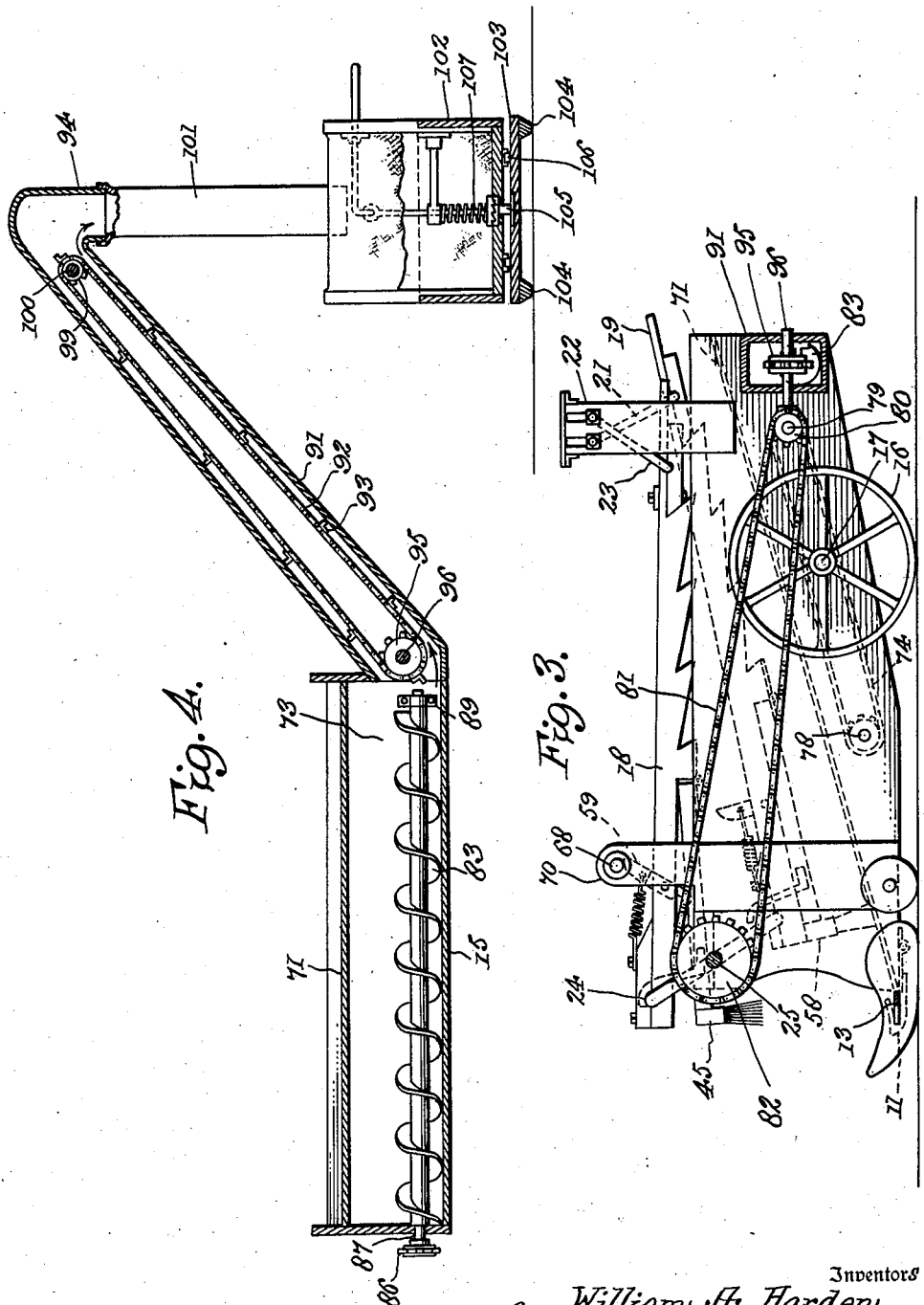

2,083,444

UNITED STATES PATENT OFFICE 2,083,444

SEED SAVING DEVICE

William A. Harden, Friendship, and Alberta D. Burks, Dyersburg, Tenn.

Application February 8, 1936, Serial No. 63,025

6 Claims. (Cl. 56—207)

This invention relates to seed saving devices and more particularly to a seed saving device which may be used with a conventional mower.

An object of this invention is to provide a seed saving means which is of such a character as to not only prevent the loss of any seed at the point of the cutting of the grain but also to remove loose seeds which are adapted to be conveyed to a collecting device forming a part of the invention.

Another object of this invention is to provide in combination with a conventional mower a seed saving means which is actuated by the forward movement of the mower and which includes clutch means to permit control of the seed saving means.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan partly in section of a mowing device having a seed saving means mounted thereon constructed according to an embodiment of this invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a detail front elevation of the seed saving device.

Figure 6 is a bottom plan of the mower brushing means.

Referring to the drawings wherein like symbols of reference designate corresponding parts throughout the several views, the numeral 10 designates generally a mowing means of conventional construction, including a stationary toothed bar 11 and a movable cutter bar 13 which is adapted to be connected to a suitable source of power, preferably the movable cutter bar 13 being connected to a driving means associated with the wheels 12 mounted on a frame structure 14. Inasmuch as the driving means for the cutter bar 13 is a conventional driving means well known in the art it is though that a further description of the driving means for this cutter bar 13 is unnecessary.

In many types of mowers or grain cutting devices the grain is formed into bundles which are dropped onto the ground by the mowing machine which also includes a binder and in a machine of this type the movement of the cut grain causes a considerable quantity of the seed to be lost, and it is for this purpose that I have provided a seed saving means associated with the mower 10 as will be hereinafter described.

A frame 15 is disposed rearwardly of the mower 10 and is provided with wheels 16 mounted on an axle 17 which is carried by the frame 15. A pair of grain agitating and seed removing members 18 and 19 are disposed within the frame 15 and the frame 18 is provided at its under side and at a point rearwardly of the forward end thereof with a plurality of teeth 20. These teeth 20 are directed in a rearward direction so that when the frames 18 and 19 are oscillated and vertically rocked the grain will be moved rearwardly of the frame 15. The frame 18 is mounted on a crank 21 which is swingably carried by a pair of supports 22 mounted on opposite sides of the frame 10 adjacent the rear thereof and extending upwardly of the frame 15. The frame 19 is swingably mounted on the crank or offset portion 23 of a crank which is also swingably carried by the upstanding support 22.

The forward end of the agitating frame 18 is mounted on a crank portion 24 of a shaft 25 and the forward end of the agitating member 19 is mounted on a crank portion 26 disposed adjacent the crank portion 24 and opposed thereto. The shaft 25 is journalled in bearings 27 and 28 carried by the forward portion of the frame 15.

The shaft 25 is rotated by means of a sprocket 29 secured to a wheel 12 and this sprocket 29 has a chain or flexible drive member 30 trained thereover. The chain 30 engages a driven sprocket 31 which is rotatably carried by a shaft 32. A clutching means in the form of toothed clutching members 33 and 34 connects the driven sprocket 31 with the shaft 32. The clutching member 33 is fixed to the sprocket 31 and the clutching member 34 is splined onto the shaft 32 and is constantly urged to clutching position by a spring 35. A forked clutch operating member 36 is operated by a hand lever 37 carried by a bar 38 which in the present instance is secured to a tongue 39. The lever 37 engages a notched lever holding member 40 also fixed to the tongue 39.

The shaft 32 is connected to the shaft 25 by means of a short shaft 41 and a pair of universal joints 42 and 43. The shaft 32 is rotatably mounted in extensions 44 carried by the frame 14.

A cutter bar brushing member generally designated as 45, is carried by the grain agitating frame 18 and comprises side bars 46, a rear end bar 47 and a front bar 48. A brush member 49 is secured to the front bar 48 and extends downwardly of the frame 45 in a position to wipe the top of the cutter 10. A pair of transversely extending bars 50 and 51 are disposed in the frame 45 between the end bars 47 and 48 and these transverse bars are provided with downwardly projecting spaced apart teeth 52 and 53 respectively. A front transverse bar 54 extends across the front of the frame 45 rearwardly of the brush 49 and is provided with a plurality of V-shaped teeth 55, as shown in Figure 6. The forward portion of the frame 18 has a recessed or rabbeted portion 56 and the frame 45 in one position thereof is adapted to be disposed within this rabbeted portion 56. The frame 45 is mounted for rocking movement with respect to the frame 18 by means of hinges 57 secured to the rear portion of the frame 45. The frame 19 has a similar brushing frame 58 which is identical with the frame 45 and a further description of the frame 58 is believed unnecessary.

The frame 45 is held in locked position with respect to the frame 18 by means of a pivoted locking bar 59 which is provided with a notched lower portion 60 engaging a fixed locking member 61 secured to one side of the frame 18. The locking lever 59 is biased to locking position by a spring 62. The frame 19 has a similar locking lever 63 engaging a lug 64 carried by the frame 58 and this locking lever 63 is biased to locked position by a spring 65. The frame 45 has a hooked shaped locking member 66 secured thereto which extends upwardly in a position to engage the crank portion 24 when the frame 18 is in its lowermost position. The frame 58 has a similar hooked shaped holding member 67 secured thereto which, as shown in Figure 2, engages the crank portion 26 when the frame 19 is in its lowermost position.

A releasing bar 68 is secured to upright members 69 and 70 carried by the frame 15 and this releasing bar 68 is disposed in the path of the movement of the locking members 59 and 63 so that when the frames 18 and 19 are moved upwardly and forwardly by rotation of the crank shaft 25 the locking members 59 and 63 will strike the releasing bar 68 and the brushing frames 45 and 58 will gravitatingly drop downwardly to the limit provided by the holding members 66 and 67. The frames 18 and 19 are permitted to swing forwardly and rearwardly by the swingable mounting means 21 and 23.

A perforate plate 71 is carried by the frame 15 and comprises a sifting means to permit the loosened seed to drop downwardly into a seed receiving chamber 72. The straw with the seeds removed therefrom will be forced rearwardly over the perforated top wall 71 of the seed chamber 72. The seed in the chamber 72 is moved rearwardly into a conveyor chamber 73 by means of an endless conveyor 74 which is provided with a plurality of seed moving bars 75. The conveyor 74 may be in the form of a flexible member which is trained over toothed members 76 and 77. The toothed members 77 are mounted on a shaft 78 rotatably carried by the frame 15 and the toothed members 76 are carried by a drive shaft 79. The drive shaft 79 carries a sprocket 80 which has a chain or flexible driving member 81 trained thereover. The chain 81 also engages a sprocket 82 secured to the shaft 25.

A screw conveyor 83 is rotatably mounted in the chamber 73 and this screw conveyor is rotated by means of a chain 84 which engages a sprocket 85 secured to the end of the shaft 79 opposite from the sprocket 80. A sprocket 86 is secured to the conveyor shaft 87 and the chain 84 is trained over these sprockets 85 and 86. The seed conveyor chamber 73 is separated from the seed chamber 72 by a partition 88 which is relatively short in height but extends upwardly substantially greater than one half the diameter of the conveyor 83. The forward end of this conveyor 83 is journalled in a bearing 89 carried by the rear wall 90 of the frame 15.

A housing 91 is secured to the frame 15 and is disposed on an upward inclination and opens at its lower end into the conveyor chamber 73. A seed lifting means including a flexible member 92 in the form of a chain having transverse bars or cups 93 is disposed in the housing 91 and is adapted to lift the seed from the conveyor chamber 73 into an outlet pipe 94 carried by the upper end of the housing 91. The conveyor 92—93 is operated by means of a sprocket 95 mounted on a shaft 96 journalled in the lower end of the housing 91. One end of the shaft 96 has a gear 97 secured thereto which meshes with a gear 98 mounted on the shaft 79. The upper end of the conveyor 92—93 engages a sprocket 99 carried by a shaft 100 extending transversely of the housing 91 adjacent the upper portion of the housing 91.

The seed dropping down in the outlet 94 passes through a flexible pipe 101 which discharges into a receiver 102. This receiver is in the form of a box which is rotatably mounted on a platform 103 having skids 104 on the under side thereof. The receiver 102 is secured to the skid platform 103 by a pivot 105 and rollers 106 are positioned between the bottom of the receiver 102 and the top of the platform 103. The receiver 102 is locked in a selected position by a spring pressed latching means 107. The receiver 102 is adapted to have bags positioned therein and the lower end of the pipe 101 is adapted to discharge into a selected bag carried by the receiver 102. The skid member 103 is secured to the frame 14 by means of forwardly extending arms or bars 108, which swingably engage in lugs 109 carried by the mower frame 14.

In the use and operation of this seed saving device the tongue 39 may be drawn by any suitable power means, as by a tractor, horses, or the like and with the rotation of the wheels 12 the sprocket 31 will be rotated by means of the chain 30. It will be understood that the cutter or mower 10 may be operated by the usual operating means therefor and the clutch including the two members 33 and 34 may be engaged by movement of the clutch lever 37. When the clutch lever 37 is moved to clutching position, as shown in Figure 1, the shaft 32 will be coupled with the driving member 30. Rotation of the shaft 32 will effect rotation of the cranks 24 and 26 which will swing the agitating members 18 and 19 in a forward and rearward movement as well as a downward and upward movement. At each downward stroke of the crank 24 the seed brushing member 45 will be released when the frame holding lever 59 strikes the releasing bar 68 so that this brushing frame 45 will contact in one cycle thereof with the top of the mower 10 and brush the seed and straw rearwardly along the top of the perforated screening member 71. The seed removing teeth 20 carried by the parallel bars forming the frame 18 will strike the cut grain with a sufficient impact to loosen seeds which will then fall through the openings in the perforate wall or screening member 71.

When the seed falls into the receiving chamber 72 the seed is moved rearwardly by the conveyor bars 75 secured to the flexible members 74. The seed moved rearwardly by the conveyor bars 75 is then discharged into the conveyor chamber 73 where the seed is moved in a direction at right angles to the movement of the seed caused by the conveyor bars 75. The conveyor 73 forces the seed into the lower end of the chute or housing 91 where the seed is picked up by the slats 93 and raised to the discharging member 94. The seed in the discharging member 94 drops through the pipe 101 into suitable bags engaging over the open lower end of the pipe 101.

It will be apparent from the foregoing that substantially all of the seed in the grain stalks will be carried to the seed chamber 72, and that the seed which is not at first loose in the pods will be loosened by the teeth 52 and 53 and also by the saw teeth 20. It will be understood that while the frame 18 is moving in one direction the frame 19 will move in the opposite direction and that the straw from which the seeds have been removed will be discharged at the rear of the frame 15, and may then be raked up or otherwise handled. The particular seed which it is desired to save is known as lespedeza seed, although of course I do not wish to be limited to the use of this machine and seed saving means for this character of seed as it is obvious that the device may be used with equal facility in the saving of other kinds of seed.

It is obvious that various changes and modifications may be made in the details of construction and design of the above specifically described embodiment of this invention without departing from the spirit thereof, such changes and modifications being restricted only by the scope of the following claims.

What is claimed is:

1. In combination, a mowing means, a seed receiving chamber rearwardly of the mowing means, an oscillatable seed removing frame disposed above the chamber, a brush carried by the forward portion of the frame and moving with said oscillatable frame whereby said brush is adapted in one cycle of the movement of the frame to wipe the upper surface of said mowing means, and operating means for oscillating said frame.

2. In combination, a mowing means, a seed receiving chamber rearwardly of the mowing means, an oscillatable seed removing frame disposed above the chamber, a second frame carried by said first frame, means for swingably securing said second frame to said first frame, operating means for said first frame, and automatic means engageable with said second frame to release said second frame for movement relative to said first frame during one cycle in the movement of the first frame, said second frame including brushing means engageable with said mowing means to brush the material cut by the mowing means and the loose seed in the direction of said seed receiving chamber.

3. In combination, a mowing means, a seed receiving chamber rearwardly of the mowing means, a perforate plate above said chamber, an oscillatable seed removing frame disposed above the plate, a second frame swingably carried by said first frame, automatically releasable locking means for locking said second frame against swinging movement relative to said first frame during one cycle in the movement of said first frame and for releasing said second frame for movement relative to said first frame during another cycle in the movement of said first frame, brushing means carried by said second frame and engageable with said mowing means and the forward portion of said plate when said second frame is in released position, and operating means for said oscillatable frame.

4. In combination, a mowing means, a seed receiving chamber rearwardly of the mowing means, an oscillatable seed removing frame disposed above the chamber, a perforate plate above said chamber, a second frame carried by said first frame, means for swingably securing said second frame to said first frame, automatically releasable locking means for holding said second frame against movement during one cycle in the movement of said first frame and for releasing said second frame for swing movement relative to said first frame during another cycle in the movement of said first frame, crank means engaging the forward portion of said first frame, operating means for said crank means, and means engaging the rear portion of said first frame to swingably support said first and second frame above said chamber.

5. In combination, a mowing means, a seed receiving chamber rearwardly of the mowing means, an oscillatable seed removing frame disposed above the chamber, a perforate plate above said chamber, a second frame carried by said first frame, a brush secured to the forward portion of said second frame and extending downwardly thereof, means for swingably securing said second frame to said first frame, automatically releasable locking means for holding said second frame against movement during one cycle in the movement of said first frame and for releasing said second frame for swinging movement relative to said first frame during another cycle in the movement of said first frame, means engaging the rear portion of said first frame for swingably supporting the rear portion of the first frame above said chamber, and crank means engaging the forward portion of said first frame for oscillation thereof.

6. In a mowing construction, a seed receiving chamber rearwardly of the mowing construction and secured thereto, a toothed oscillatable seed removing frame disposed above the chamber, a perforate plate above said chamber, a second toothed frame carried by said first frame, a brush secured to the forward portion of said second frame and extending downwardly thereof, means for swingably securing said second frame to said first frame, automatically releasable locking means for holding said second frame against movement during one cycle in the movement of said first frame and for releasing said second frame for swinging movement relative to said first frame during another cycle in the movement of said first frame, operating means for said first frame, means for swingably supporting said first frame above the chamber, means for removing the seed from the receiving chamber, a seed conveying chamber rearwardly of the receiving chamber, a conveyor in said conveying chamber, means communicating with said conveying chamber for elevating the seed, a tubular discharge member connected to said elevating means, and a collecting member below said discharge member.

WILLIAM A. HARDEN.
ALBERTA D. BURKS.